Figure 1:
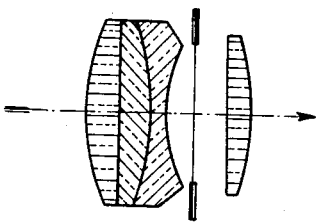

May 28, 1940.    A. W. TRONNIER    2,202,749
ASYMMETRIC OBJECTIVE
Filed Aug. 9, 1938

Inventor
Albrecht W. Tronnier
By Sommers & Young attys

Patented May 28, 1940

2,202,749

UNITED STATES PATENT OFFICE 2,202,749

ASYMMETRIC OBJECTIVE

Albrecht Wilhelm Tronnier, Gottingen, Germany, assignor to Jos. Schneider & Co. Optotechnische Gesellschaft Berlin, Berlin, Germany, a firm of Germany Application August 9, 1938, Serial No. 223,960
In Germany October 4, 1935

1 Claim. (Cl. 88—57)

The invention relates to an asymmetric objective comprising two air-spaced components, the component on the side associated with the shorter conjugate distance having a greater collecting action than the other component of the complete system which is on the other side of the diaphragm. The component on the side associated with the longer conjugate distance is built up from three lenses cemented together and has the form of a meniscus with surfaces concave towards the side associated with the shorter conjugate distance, at least one internal cemented face being concave towards the side associated with the longer conjugate distance. The central lens incorporated in this component consists of a glass the refractive index of which for each colour is at least 0.08 lower than the refractive index of each of the two adjacent lenses for the same colour, whereas in addition the inner surface of the front component adjacent the definitely collecting component on the image side has a greater negative refracting power than the adjacent inner surface of the component on the image side. The sum of the refraction differences at the cemented surfaces in the front component minus the refraction difference in the rear component has a positive value of $\Delta N = (n_1 - n_2) + (n_2 - n_3) - (n_4 - n_5)$ and is greater than 0.005 but at most 0.185, where $\Delta N$ is the sum of the refraction differences and ($n_1$ to $n_5$) are the respective refraction indices of the glass of lenses $L_1$ to $L_5$, respectively.

In comparison with known objectives of this kind, which hitherto could be made only with a relative aperture of about f.7 and a useful angle of about 60°, the invention resides in that the numerical value of the radius of this inner surface of the component on the image side, which surface faces towards the front component, is at least double the numerical value of the radius of the said inner surface of the component on the side associated with the longer conjugate distance.

By this construction in accordance with the invention the light-collecting power of such an objective can be increased appreciably while maintaining or even increasing the useful image angle, so that for example a relative aperture of f.5 or even f.3.5 and more if necessary, can be obtained. In this way the relative brightness requisite for photographs for measurement purposes with unfavourable illumination can be obtained without impairing the quality of the reproduction by residual image error and reducing the requisite contrast by superimposed fog from glass-air boundary reflectors.

Particularly for small relative apertures of the system, the collecting component of greater refracting power located on the other side of the diaphragm can be a single lens. For longer relative apertures in view of the requisite precise coma correction, this component also will be built up from two or more single lenses cemented together, in which case the associated radii of curvature must be shorter than those of the uncemented component.

Two embodiments of the objective according to the invention are illustrated diagrammatically by way of example in the accompanying drawing.

Figure 2:
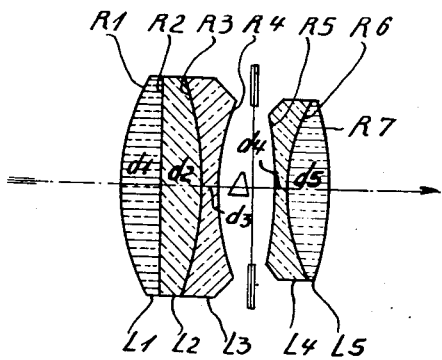

Fig. 1 shows a system with a relative aperture of f.6.8 whereas Fig. 2 shows an objective with a relative aperture of f.5 in which the component of the side associated with the shorter conjugate distance consists of two single lenses of opposite refraction cemented together.

The data given in the appended tables relate to objectives with components constructed in a manner analogous to that shown in Fig. 2, and the radii of curvature, lens thicknesses and air spacings are given in millimetres. The refractive indices in these examples are for the violet ray in Example 1 and for the yellow ray in Example 2. The colour dispersion in both examples is characterised by the Abbe number $\nu$.

*Example I*

[Relative aperture f.5; f=100 mm.]

$R_1 = +21.80$ $R_2 = +523.1$ $R_3 = -28.35$ $R_4 = +17.66$ $R_5 = -82.22$ $R_6 = +17.66$ $R_7 = -38.85$ $d_1 = 3.924$ $n_1 = 1.6630$ $\nu_1 = 53.3$ $d_2 = 4.360$ $n_2 = 1.4910$ $\nu_2 = 70.0$ $d_3 = 1.308$ $n_3 = 1.6260$ $\nu_3 = 37.7$ $\Delta = 6.105$ diaphragm space $d_4 = 1.308$ $n_4 = 1.5910$ $\nu_4 = 41.3$ $d_5 = 3.793$ $n_5 = 1.6760$ $\nu_5 = 51.2$

*Example II*

[Relative aperture f.3.5; f=100 mm.]

$R_1 = +29.2$ $R_2 = \infty$ $R_3 = -41.1$ $R_4 = +22.6$ $R_5 = \infty$ $R_6 = +21.7$ $R_7 = -62.3$ $d_1 = 7.6$ $n_1 = 1.7015$ $\nu_1 = 41.2$ $d_2 = 6.1$ $n_2 = 1.4875$ $\nu_2 = 70.0$ $d_3 = 1.8$ $n_3 = 1.6545$ $\nu_3 = 33.8$ $\Delta = 10.9$ diaphragm space $d_4 = 1.8$ $n_4 = 1.6254$ $\nu_4 = 35.6$ $d_5 = 14.1$ $n_5 = 1.7015$ $\nu_5 = 41.2$

I claim:

An asymmetric objective comprising two air spaced components in axial alignment and axially spaced apart a small distance on opposite sides of the diaphragm, the component on the side associated with the shorter conjugate distance having two cemented elements and having a greater collecting action than the other component, the component on the side associated with the longer conjugate distance being built up from three lenses cemented together and having the form of a meniscus with surfaces concave towards the side associated with the shorter conjugate distance while at least one internal cemented face is concave towards the side associated with the longer conjugate distance and moreover the central lens incorporated in this component consists of a glass the refractive index for each color is at least 0.08 lower than the refractive index of each of the two adjacent lenses for the same color, and in addition the surface of the front component adjacent the definitely collecting component on the image side has a greater negative refraction power than the adjacent inner surface of the component on the image side, the sum of the refraction differences at the cemented surfaces in the front component minus the refraction difference in the rear component having a positive value of $\Delta N = (n_1 - n_2) + (n_2 - n_3) - (n_4 - n_5)$ and is greater than 0.005 and at most 0.185, where $\Delta N$ is the sum of the refraction differences and ($n_1$ to $n_5$) are the respective refraction indices of the glass of lenses $L_1$ to $L_5$, respectively.

ALBRECHT WILHELM TRONNIER.